United States Patent [19]

Salazar et al.

[11] Patent Number: 5,021,781

[45] Date of Patent: Jun. 4, 1991

[54] TWO STAGE QUADRATURE INCREMENTAL ENCODER

[75] Inventors: Edilberto I. Salazar, Brookfield; Gilbert N. Riley, Wilton, both of Conn.

[73] Assignee: Pitney Bowes Inc., Stamford, Conn.

[21] Appl. No.: 423,330

[22] Filed: Oct. 18, 1989

[51] Int. Cl.$^5$ .................... H03M 1/22; G05B 13/00
[52] U.S. Cl. ........................ 341/13; 341/11; 318/561; 318/603
[58] Field of Search ............ 341/11, 13, 116; 250/231 GY, 231 SE, 233; 318/560, 561, 603

[56] References Cited

U.S. PATENT DOCUMENTS

| | | | |
|---|---|---|---|
| 4,580,046 | 4/1986 | Sasaki et al. | 341/11 |
| 4,630,210 | 12/1986 | Salazar et al. | |
| 4,631,681 | 12/1986 | Salazar et al. | |
| 4,635,205 | 1/1987 | Eckert, Jr. et al. | |
| 4,636,959 | 1/1987 | Salazar et al. | |
| 4,638,732 | 1/1987 | Salazar et al. | |
| 4,646,635 | 3/1987 | Salazar et al. | |
| 4,665,353 | 5/1987 | Salazar et al. | |
| 4,774,446 | 9/1988 | Salazar et al. | |

FOREIGN PATENT DOCUMENTS 0116409 5/1989 Japan .
0229912 9/1989 Japan .

OTHER PUBLICATIONS

Furr, Rick & Dorsey, Glenn, "Tips for Applying Servo Positioning Systems", *Machine Designs*, Mar. 24, 1988, pp. 70-73.

Primary Examiner—William M. Shoop, Jr.
Assistant Examiner—Helen Kim
Attorney, Agent, or Firm—Robert E. Meyer; David E. Pitchenik; Melvin J. Scolnick

[57] ABSTRACT

An incremental position encoder and method are disclosed herein for a close loop position control system, for example, for positioning a printing device in an electronic postage meter. The incremental position encoder and method includes three channels, first and second of which provide signals for coarse position determination and first or second and third of which provide signals for fine position determination.

24 Claims, 9 Drawing Sheets

| SYMBOL | PARAMETER | MIN | MAX |
|---|---|---|---|
| $\theta_c$ | ENCODER QUADRATURE CYCLE PER DIGIT, IN ELECTRICAL DEGREES | 349.2° | 370.8° |
| $\theta_1, \theta_2, \theta_3, \theta_4$ | ENCODER STATE SWITCHING POINT, IN ELECTRICAL DEGREES | 87.3° | 92.7° |
| $t_S$ | ENCODER STATE TRANSITION TIME | 3.0ms | |
| $S_{FD}$ | FULL-DIGIT ENCODER STATE | D0 = 0 D1 = 0 | |

TWO STAGE QUADRATURE INCREMENTAL ENCODER

RELATED APPLICATIONS

The following applications, all assigned to the assignee of this application, are related to this application: Ser. No. 423,822, filed Oct. 18, 1989, filed Oct. 18, 1989, titled MICROCOMPUTER-CONTROLLED ELECTRONIC POSTAGE METER HAVING PRINT WHEELS SET BY SEPARATE D.C. MOTORS; Ser. No. 423,813, filed Oct. 18, 1989, titled MICROCOMPUTER-IMPLEMENTED CONTROL OF SEPARATE D.C. MOTORS FOR SETTING A PLURALITY OF POSTAGE METER PRINT WHEELS; and., Ser. No. 423,812, filed Oct. 18, 1989, titled FRAUD DETECTION IN POSTAGE METER HAVING UNSECURED PRINT WHEELS. The disclosures of those three applications are incorporated herein by reference.

BACKGROUND OF THE INVENTION

The invention disclosed herein relates generally to a close loop position control system, for example, for positioning a printing device in an electronic postage meter. More particularly, the invention relates to an actual incremental position encoder and incremental encoding method for such a system.

Known digital position control systems for controlling a d.c. motor may include a single stage, two channel incremental encoder which provides in response to motor shaft rotation two electrical signals 90 electrical degrees out of phase, i.e., in quadrature. The two signals together provide N quadrature states per motor shaft rotation. Shaft position is determined by counting the quadrature states and rotation direction is determined from the phase of the two signals, i.e., which signal leads (or lags) the other. For example, the following U.S. patents, all assigned to the assignee of this application, disclose digital controllers employing an incremental quadrature encoder of the type described above: U.S. Pat. Nos. 4,630,210; 4,631,681; 4,635,205; 4,636,959; 4,646,635; 4,665,353; 4,638,732; and 4,643,089; all issued to Salazar et al, and U.S. Pat. No. 4,774,446; issued to Kirshner et al. The disclosures of all of those patents are incorporated herein by reference.

These patents each disclose an electronic postage meter including a computer controlled d.c. motor use to control print wheels of the electronic postage meter. The control loop for the d.c. motor is implemented by the computer and software, except for the amplifier driving the d.c. motor, an incremental quadrature encoder of the type described above, and external counting circuitry for decoding the signals from the quadrature encoder. External decoding circuits are currently available as monolithic integrated circuits, for example, DHC 2000 from Texas instruments Incorporated. If desired, the quadrature signals may be decoded by the computer. Whether an external circuit or the computer decodes the quadrature output signals of the encoder depends upon whether the computer's internal counting circuit is available or is being used for other purposes.

The computer and the software calculate and apply, to the amplifier for the d.c. motor, pulse width modulated (PWM) drive signals utilizing a digital compensator derived from an analysis of the d.c. motor, the motor load, and other control loop components. The d.c. motor is driven according to a predetermined motion profile. The encoder and external counting circuitry for decoding the quadrature signals provide digital signals to the computer and the computer provides digital PWM drive signals so that analog-to-digital and digital-to-analog converters are not required in the d.c. motor control loop.

In order to attain high positional accuracy, digital controllers of the type described above sample at 1 ms or less intervals, which requires the controllers to have a motor control bandwidth of 1 KHz or greater. Such bandwidths are relatively high and increase the cost of the controller.

The control loop in the digital controllers in the above patents utilizes a single stage, two channel, quadrature incremental shaft encoder which includes a transparent disk having a plurality of opaque lines formed at equidistantly angularly-spaced intervals along at least one of the disc's opposed major surfaces, and an optical sensing device for serially detecting the presence of the respective opaque lines as they successively pass reference positions.

In response to detecting the presence of the opaque lines, the encoder provides two output signals on two separate lines or channels in quadrature.

The incremental quadrature shaft encoders described above are of high resolution and are used in high bandwidth systems. Both the shaft encoders and the digital controller employing them tend to be expensive and, because of the high bandwidth requirements, the digital controllers are frequently dedicated to motor control.

Another single stage, two channel incremental quadrature encoder is described in application Ser. No. 423,822, and in application Ser. No. 423,813, both referenced above.

The incremental quadrature encoder disclosed in the above applications is of low resolution and is relatively inexpensive. However, it is used in a lower cost, lower accuracy, digital controller for applications where high controller bandwidth is not a requirement. For example, the digital controller described in the two patent applications referenced immediately above operates with a 2.5 ms sampling period (400 Hz bandwidth). Those patent applications describe a digital controller which effectively simultaneously controls five d.c. motors so that five print wheels coupled to respective d.c. motors may effectively be set in parallel. The controller described in those applications accomplishes control of the five d.c. motors utilizing a low cost, low-power microcomputer including a single low-cost, low-power microprocessor (8-bit). Yet, because of the low bandwidth requirements, the microcomputer is able to control all other postage meter functions including postage accounting, printing, fault monitoring, etc.

While expensive, high resolution incremental quadrature encoders are available for use in high bandwidth, high accuracy control systems, and inexpensive, low resolution incremental encoders are available for lower bandwidth, lower accuracy systems, there is a need for an inexpensive, high resolution incremental shaft encoder for use in low (or high) bandwidth, high accuracy control systems.

SUMMARY OF THE INVENTION

It is an object of the invention disclosed herein to provide an incremental position encoder and method of incremental position encoding, particularly of low cost, having an improved It is another object of the invention to provide such an encoder and method which may be utilized in a low bandwidth close loop control system.

The above and other objects are achieved by a two stage incremental position encoder and method according to the invention which includes three channels, first and second channels (e.g., CH A and CH B) of which provide signals for coarse position determination and first or second and third of which (e.g., CH B and CH C) provide signals for fine position determination.

In a preferred embodiment, the signals of the first and second channels are substantially out of phase, but less than by 180°, e.g., 90° out of phase, i.e., they are in quadrature and the signals of the third channel are 180° out of phase with the signals of the first channel and 90° out of phase with the signals of the second channel. The encoder includes an encoder wheel having first series and second series of slotted openings for first and second of the channels (CH A and CH B), and a third series of narrower width slotted openings for the third channel (C). The width of slotted openings of the third series is exactly ½ the width of slotted openings of the first and second series, and the slotted openings of the third series are positioned to lie exactly in the center of the width of slotted openings of either the first or the second series. The slotted openings of the first and second series are radially spaced from each other and offset by 90°. The slotted openings of the third series are radially spaced inwardly from the slotted openings of the second series of openings and are offset from the first series by 180° and from the second series by 90°.

Optical sensors sense the presence of the openings at respective reference points and provide the three signals described above. The signals obtained from sensors for the first and used for coarse position determination. The signals obtained from the third series of openings are used with the signals obtained from the first or second series of openings during a settling time for fine position determination.

A two stage incremental position encoder according to the invention comprises: a movable element whose movement is to be encoded; first means for providing first and second pulse signals having a number of pulses related to an incremental movement of the movable element, the number of pulses in the first and second signals being equal for a given incremental movement of the movable element, the widths of the pulses of the first signal being equal to the widths of corresponding pulses of the second signal and corresponding pulses of the first and second signals being out of phase by a substantial amount but less than by 180°; second means for providing a third signal having a number of pulses related to incremental movement of the element, the number of pulses in the third signal being equal to the number of pulses in the first and in the second signals for the same given incremental movement of the element, the widths of the pulses of the third signal being less than the widths of the pulses of the first and second signals, and the pulses of the third signal starting before the start of corresponding pulses of either the first o the second signals and ending before the end of the pulses of the first or the second signal.

A method according to the invention of generating signals related to incremental movement of a movable element comprises: generating first and second pulse signals having a number of pulses related to a incremental movement of the movable element, the number of pulses in the first and second signals being equal for a given incremental movement of the movable element, the widths of the pulses of the first signal being equal to the pulses of the first and second signals being out of phase by a substantial amount but less than by 180°; generating a third signal having a number of pulses related to incremental movement of the element, the number of pulses in the third signal being equal to the number of pulses in the first and in the second signals for the same given incremental movement of the element, the widths of the pulses of the third signal being less than the widths of the pulses of the first and second signals, and the pulses of the third signal starting before the start of corresponding pulses of either the first o the second signals and ending before the end of the pulses of the first or second signal.

Apparatus according to the invention for determining a given incremental movement of a movable element from a first fine home position to a second fine home position comprises: first means for generating first and second pulse signals having a number of pulses related to the incremental movement of the movable element between the first fine home position and a second coarse home position, the numbers of pulses in the first and second signals being equal for the incremental movement of the movable element, the widths of the pulses of the first signal being equal to the widths of corresponding pulses of the second signal and corresponding pulses of the first and second signals being out of phase by a substantial amount but less than by 180°; second means for generating a third signal having a number of pulses related to the incremental movement of the element, the number of pulses in the third signal being equal to the number of pulses in the first and in the second signals for the incremental movement of the element, the widths of the pulses of the third signal being less than the widths of the pulses of the first and second signals, and the pulses of the third signal starting before the start of corresponding pulses of either the first or the second signals and ending before the end of the pulses of the first or second signals; means for counting the transitions of the pulses of the first and second signals starting with movement of the movable element from the first fine home position, the number of the transitions being related to the incremental movement of the movable member; and means for detecting: when the number of transitions corresponds to the distance between the first fine home position and second coarse home position; the simultaneous presence of pulses in the first and second signals corresponding to the second coarse home position of the movable element; and the simultaneous presence of pulses in either the first and second signals and the third signal corresponding to the second fine home position of the movable element.

A method according to the invention of determining a given incremental movement of a movable element from a first fine home position to a second fine home position, comprises: generating first and second pulse signals having a number of pulses related to the incremental movement of the movable element between the first fine home position and a second coarse home position, the numbers of pulses in the first and second signals being equal for the incremental movement of the movable element, the widths of the pulses of the first signal being equal to the widths o corresponding pulses of the second signal and corresponding pulses of the first and second signals being out of phase by a substantial amount but less than by 180°; generating a third signal having a number of pulses related to the incremental movement of the element, the number of pulses in the third signal being equal to the number of pulses in the first and in the second signals for the incremental movement of the element, the widths of the pulses of the third signal being less than the widths of the pulses of the first and second signals, and the pulses of the third signal starting before the start of corresponding pulses of either the first or the second signals and ending before the end of the pulses of the first or second signal; counting the transitions of the pulses of the first and second signals starting with movement of the movable element from the first fine home position, the number of the transitions being related to the incremental movement of the movable member; detecting when the number of transitions corresponds to the distance between the first fine home position and second coarse home position; detecting the simultaneous presence of pulses in the first and second signals corresponding to the second coarse home position of the movable element; and detecting the simultaneous presence of pulses in the either the first or second signals and the third signal corresponding to the second fine home position of the movable element.

The first and second pulse signals are preferably square wave pulse signals out of phase by 90°, and the third signal preferably comprises rectangular pulses starting after and ending before corresponding cycles of the square wave of either the first or the second signal. Three channels or output lines are provided for the first, second and third signals.

In a specific embodiment, the movable element is a wheel, and the first means comprises first and second series of circumferentially-extending variations in the wheel and the second means comprises a third series of circumferentially-extending variations in the wheel. The first, second and third series of variations are radially spaced and the variations of respective series extend about respective circumferences of first, second and third circles. The circumferential widths of the first and second variations are equal and circumferentially offset by half the circumferential width of a variation. The circumferential widths of the variations of the third series are substantially less than the circumferential widths of the variations of the first and second series and are centered with respect to corresponding variations of either the first and second series of variations. The first means includes means for detecting the variations of the first and second series and the second means includes means for detecting variations of the third series.

The variations of the first, second and third series are optically detectable, and the first means includes means for projecting light at variations in the first and second series of variations and for detecting light emanating from the variations of the first and second series of variations, and the second means includes means for projecting light at variations of the third series of variations and for detecting light emanating from variations of the third series of variations.

In a preferred embodiment, first and second series of variations comprise circumferentially-extending openings in the wheel and the third series of variations also comprises circumferentially-extending openings in the wheel. The first, second and third series of openings are radially spaced and the openings of respective series extend about respective circumferences of first, second and third circles. The circumferential widths of the first and second openings are equal and circumferentially offset by half the circumferential width of an opening, and the circumferential widths of the openings of the third series are substantially less than the circumferential widths of the openings of the first an second series and being centered with respect to corresponding openings of one of the first and second series of openings. The first means includes means for projecting light through openings in the first and second series of openings and for detecting light projected through openings of the first and second series of openings, and the second means includes means for projecting light through openings of the third series of openings and for detecting light projected through openings of the third series of openings.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

The invention is illustrated by way of example and not like references denote the same or corresponding parts, and in which.

DESCRIPTION OF THE PREFERRED EMBODIMENTS

The incremental encoder according to the invention is advantageously used in a close servo loop control system or digital controller for controlling a d.c. motor in an electronic postage meter. Description of the presently preferred embodiment of the inventive encoder is made with respect to use in such a control system. However, it is not intended to limit the invention to use in such a system.

Figure 1:
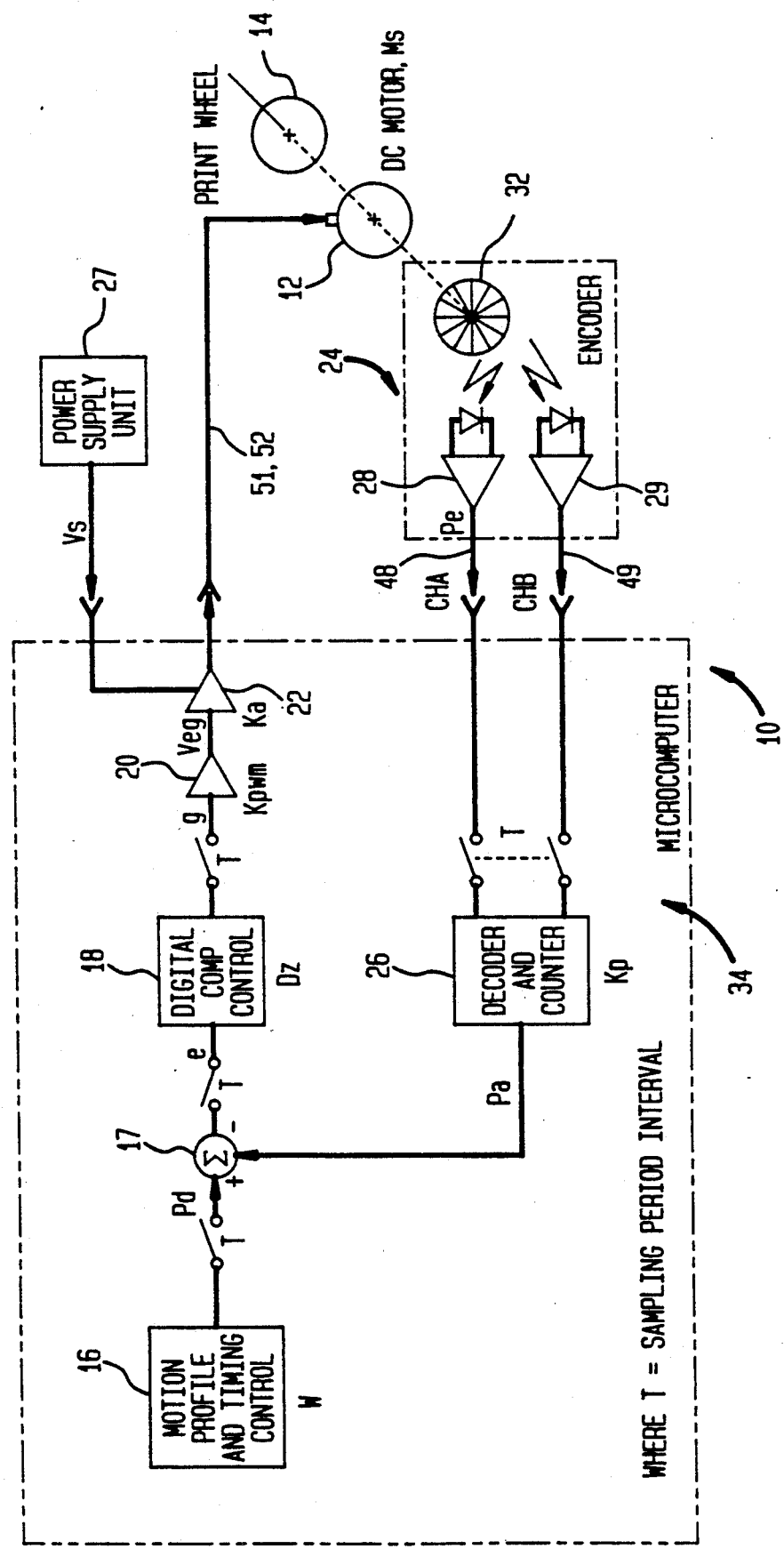
FIG. 1 is a functional block diagram of a servo loop implemented in part by a microprocessor for controlling the position of a print wheel driven by a d.c. motor.

Referring to FIG. 1, a closed servo loop 10 controls a d.c motor 12 to set a print wheel 14 in an electronic postage meter (not shown). Servo loop 10 is a digital servo system, i.e., a closed-loop digital position controller. Servo loop 10 includes the following: a motion profile and timing control 16 (W), a summing junction 17, a digital compensation control or filter 18 (Dz), a pulse width modulator (PWM) 20 (Kpwm), an output stage drive amplifier 22 (Ka), an encoder 24, an encoder state quadrature decoder and counter 26 (Kp) and a power supply 27. Encoder 24 includes encoder sensors 28, 29 and encoder wheel 32.

Motion profile and timing control 16, summing junction 17, digital compensation control 18, pulse width modulator 20 and encoder state quadrature decoder and counter 26 illustrated in FIG. 1 as hardware may be implemented by a microprocessor (not shown) of a microcomputer 34, and software, as described in the patents and patent applications referenced above. Microcomputer 34 is designated in FIG. 1 by a rectangular box enclosing the elements just mentioned. Encoder sensors 28, 29 provide digital signals directly as described below, and PWM circuit 20 provides digital d.c. motor drive signals so that loop 10 does not require an analog-to-digital converter and a digital-to-analog converter. timing control 16 may be entered by means of a keyboard (not shown) or entered from an external system. Switches "T" indicate schematically the sampling time period "T".

Figure 2:
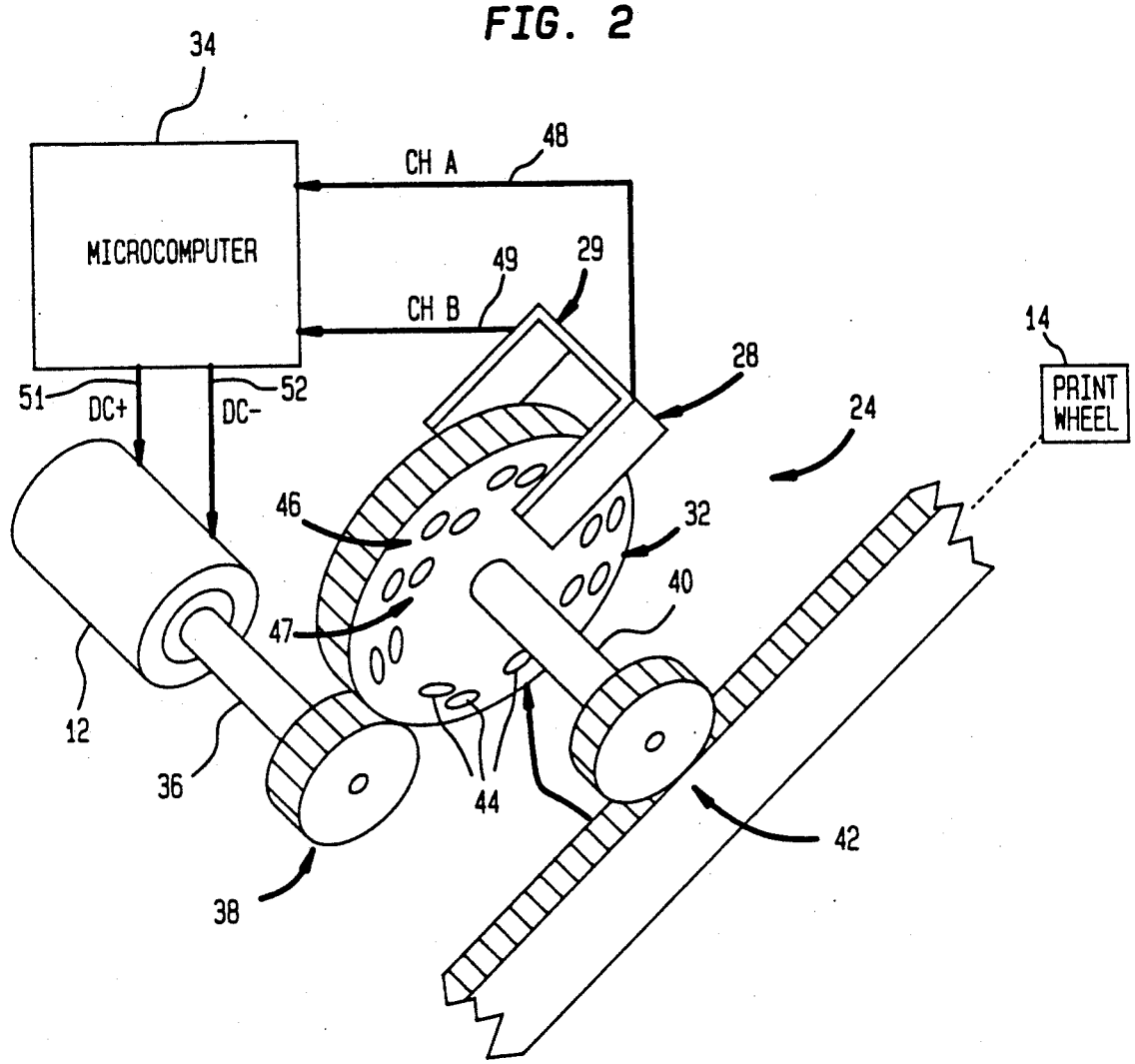
FIG. 2 is a diagram of the drive mechanism for setting the position of the print wheel in the system of FIG. 1 including a single stage, two channel incremental quadrature encoder for providing signals related to the actual position of the print wheel.
Figure 3:
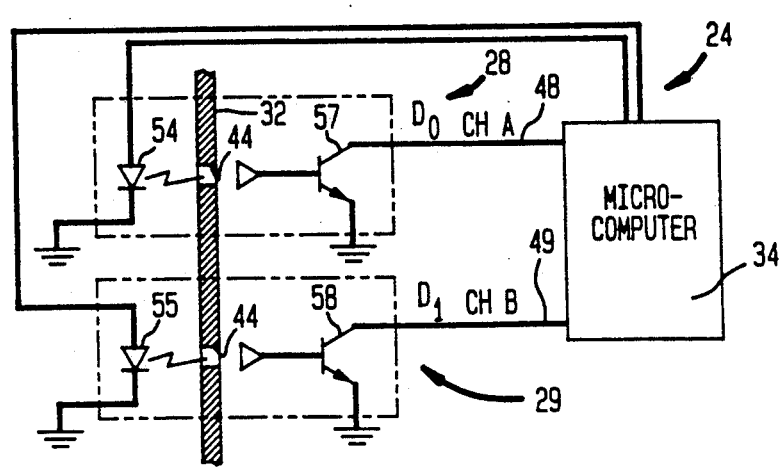
FIG. 3 is a schematic diagram of the sensor for the two channel encoder of FIG. 2.

Referring to FIGS. 2 and 3, single stage, two channel encoder 24 includes CH A sensor 28, CH B sensor 29 and position encoder wheel 32 coupled to the shaft 36 of d.c. motor 12 by gearing 38. The shaft 40 of encoder wheel 32 is coupled to print wheel 14 by a rack and pinion drive 42. Thus, the angular position of print wheel 14 is related to the angular position of encoder wheel 32, which is sensed by means of sensors 28 and 29, and slotted openings 44 in wheel 32 arranged in an outer series 46 (CH A) extending about the circumference of an outer circle and an inner series 47 (CH B) arranged about the circumference of an inner circle concentric with said outer circle. Slotted openings 44 have equal circumferential widths and are equidistantly, angularly spaced along the circumference of a respective concentric circle. Slotted openings 44 in inner and outer series 46 and 47 are radially spaced and circumferentially offset by a substantial amount but less than by 180°. In the preferred embodiment, they are offset by 90°. This doubles the number of encoder states available over a single series of openings. The CH A and CH B output lines 48, 49 from sensors 28 and 29 are coupled to quadrature decoder and counter 26 in microcomputer 34 which supplies the motor drive signals to motor 12 on lines 51 and 52 via amplifier 22 (see FIG. 1).

Sensors 28 and 29 (FIG. 3) each comprise a light emitting diode (LED) 54, 55 and a photo transistor 57, 58, respectively. LEDs 54, 55 are each selectively connected in series with a source of power via microcomputer 34 and are positioned as reference points for wheel 32 on one side thereof to project light through a respective series 46, 47 of slotted openings 44. Transistors 57, 58 are positioned on the other side of wheel 32 to receive light projected through respective series 46, 47 of slotted openings 44. Transistors 57, 58 are connected as switches with their emitters connected to ground and their collectors coupled to microcomputer 22 as the CH A output line 48 and CH B output line 49. These outputs are sensed by microcomputer 22 to determine when slotted openings 44 pass the reference points of LEDs 54, 55, i.e., when transistors are switched on (logic "0" state on the respective line 48 or 49) by light from LEDs 54, 55.

Figure 4:
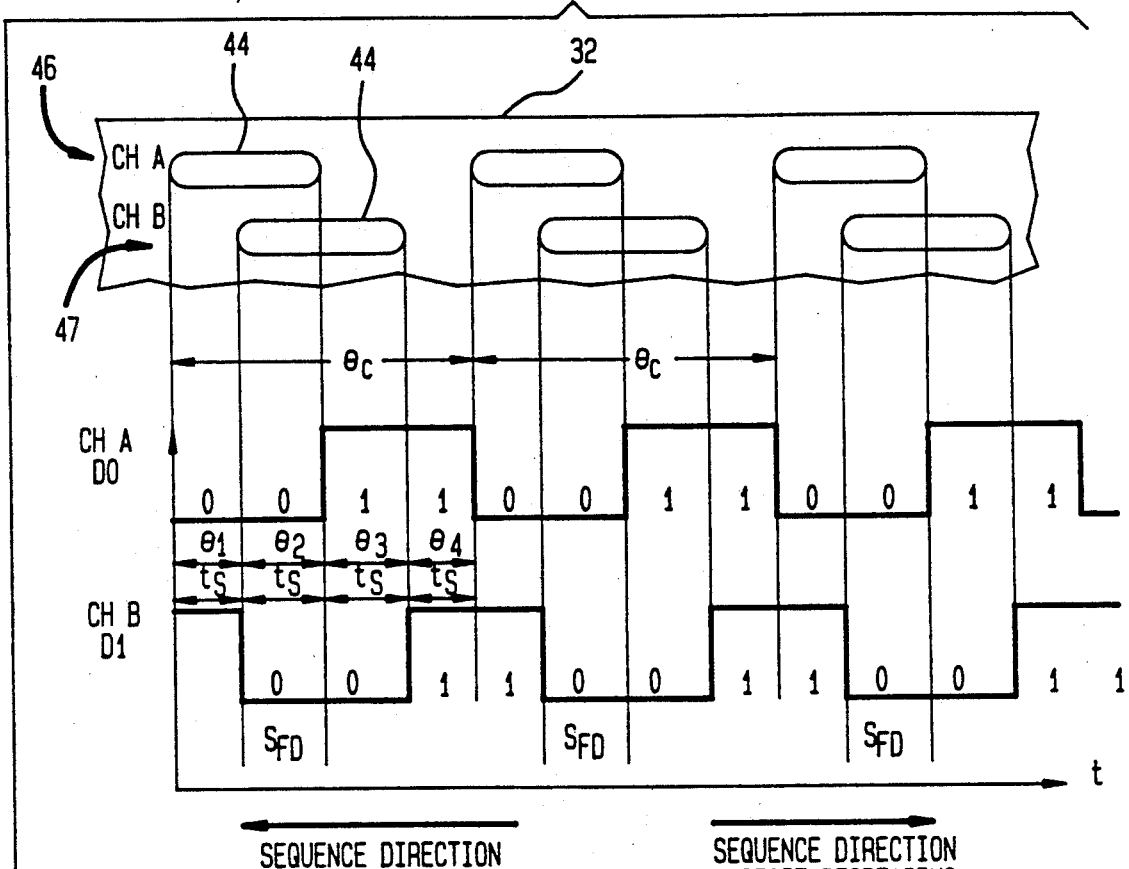
FIG. 4 is a diagram illustrating the relationship of the encoder wheel and the two channel quadrature signals generated by the encoder depicted in FIG. 2.

The signals obtained from sensors 28, 29 on the CH A and CH B lines 48 and 49 are shown in FIG. 4. CH A and CH B sensor signals are quadrature decoded as described below to give the actual position of print wheel 14. FIG. 4 also shows the relationship between the encoder quadrature signals and electrical degrees including encoder state switching points and transition times for encoder states.

Figure 5:
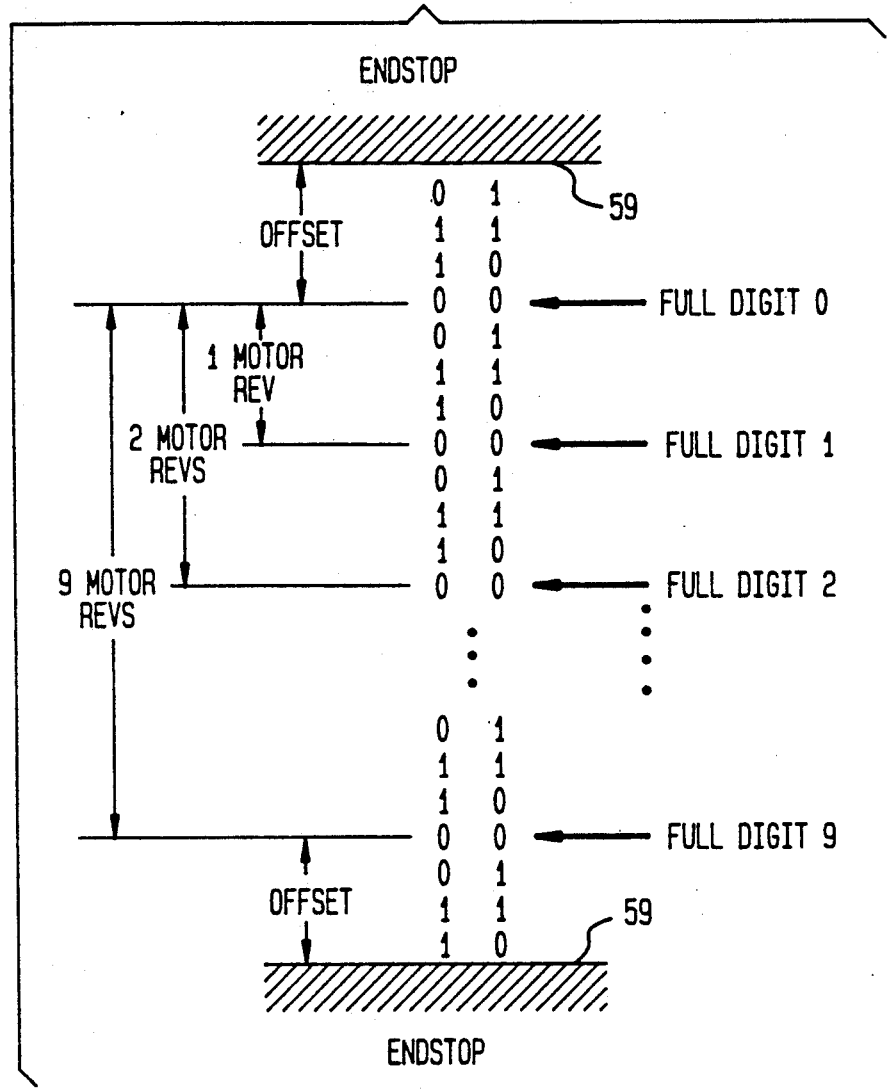
FIGS. 5 and 6 are diagrams illustrating the relationship of the output signal of the encoder depicted in FIG. 2 and the d.c. motor shaft position.
Figure 6:
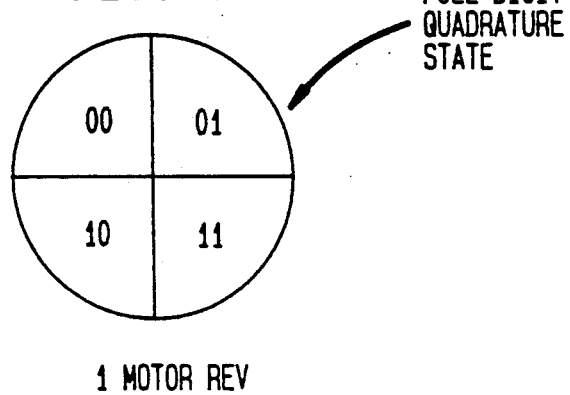

Referring to FIGS. 4-6, one revolution of motor 12 corresponds to a full-digit quadrature state, and nine motor revolutions are required to set a print wheel 12 to all of its digit values, 0-9. Correspondingly, an encoder transition is equal to one quarter motor revolution. Each print wheel is rotatable between end stops 59 offset from the "0" and "1" digits by a maximum offset distance corresponding to one half motor revolution, which in turn corresponds to a maximum of three encoder transitions. All full digit quadrature states are "00" ("SFD") states.

A relative incremental encoding scheme is used in control loop 10 where the endstop position for each print wheel is used as the reference point. Upon power up, or system reset, the print wheel position is verified relative to these endstop positions. The print wheel digit is set to zero, then, set to nine, and then, back to zero.

To set the position of print wheel 14, motor 12 is driven in the opposite direction of the last motion until it stall against the endstop (seek-move). Using the information that an endstop is no more than ½ motor revolution (½ digit), the number of encoder transition counts from the nearest full digit position to the endstop is derived. This is an offset count which cannot be greater than three, as indicated above. To be able to use the endstop as a reference point for the relative encoding scheme for each print wheel, the endstops, the full digit mechanical home positions and the encoder discrete states, must be aligned as shown in FIG. 5. Once motor 12 is at the endstop position, the distance from the endstop to the opposite direction's farthest full-digit home position is calculated, i.e., total displacement is 9 digit move counts plus the offset count (see FIG. 6). With this total distance input, motor 12 is driven to the farthest full-digit home position to validate the established reference point. That is, a successful move means that the starting position is, indeed, the print wheel's endstop, and the final position is a full digit home 0 or 9 (depending on the direction of motion).

When a set-postage command is active, i.e., a desired position is input to control loop 10, microcomputer 34 provides motor drive signals to motor 12 to position print wheel 14 to the desired digit. After the print wheel has been positioned, the final digit position is validated to ensure that the motion control positioning accuracy is in line with the full digit mechanize home positions, described below. If a positioning error occurs, a retry routine is executed. Digit setting is concluded to be successful when the print wheel completes its motion and its final position is a full digit home position.

The motor commands for the d.c. motor 12 are derived from the difference between the print wheel's desired and present of motion obtained from the difference in phase between the CH A and CH B signals, and a magnitude that determines the total distance to be traveled (displacement) in terms of the number of encoder state transitions.

Referring to FIG. 1, digital compensation control 18 develops an output in the direction to correct the loop error, i.e., reduce the error to zero. Hence, if no error exists, the output is zero. In particular, if an error, +, exists between the desired position (Pd) and the actual position of the motor, as detected through the encoder transition count (Pa) in a sampling instant (T), digital compensation control 18 computes the loop compensation for the error and the output is used by the pulse-width modulator 20 to drive the d.c. motor 12 to move print wheel 14 in the direction of the desired position, i.e., the actual Pa will always follow the desired Pd position to reduce the position error e to zero. Hence, the error may come from the motion profile and timing control 16 which discretizes the desired digit-move into Pd (every T interval).

The motor position command is presented to the servo loop 10 through the motion profile and timing control 16. This element contains the logic for generating the desired position command, Pd, depending on the motion phase, according to a desired or projected velocity profile and supervises motion, i.e., motion start, phases, termination, and fault conditions.

At the first phase of the motion, the total desired displacement is presented to the servo loop as Pd, thereby, creating a large initial error which saturates the control at 100% PWM duty cycle, driving the motor to its maximum loaded acceleration, i.e., step function response. The time it takes for the motion to reach its peak slew speed depends on the mechanical system time constant. The motion enters the second phase when the sampled actual position Pa indicates that the remaining distance to be travelled is equal or less than the computed deceleration distance, Td. Once this occurs Pd becomes the remaining distance discretized every sampling period T at the desired deceleration rate. At the end of the computed deceleration time Td (in units of T), the discretized Pd(T) is equal to the total desired displacement. The Sd and Td are inputs to digital compensation control 18 computed by the motion profile and timing control 16, together with the desired total displacement (in encoder transition counts). Hence, the third phase is where Pd remains constant for the settling time period of the motion. The motion is concluded to be complete if no position error is detected within a settling time period, Ts; else, the motion is allowed again to settle within another settling time period for a maximum of ten periods (as in the case of an underdamped system).

Encoder quadrature decoder and counter 26 in servo 10 loop transforms the motor shaft position into a Gray Code digital count through the two channel output of the digit encoder sensors 27,28 shown in FIGS. 1-3. At every sampling instant, T, the digit sensor output is read (using a best-of-three sampled voting routine), then, the quadrature state is decoded, and depending on the state sequence direction, as shown in Table I below, the actual position counter, Pa, is incremented or decremented from its initial value. Hence, the count value is an incremental number of encoder state transitions relative to the initial value of the counter. In case of the quadrature decoding error of counting two transitions in a sampling interval (due to electrical noise, or, encoder/motor deviations accepted tolerance), an incremental count of 0 is taken which forces a positioning error to be detected at the end of the motion.

TABLE I

| Encoder Sensor Quadrature Output Sequence | | | | |
|---|---|---|---|---|
| | | CH A | CH B | |
| Digit increasing ↓ | ↑ | 0 | 0 | HOME |
| ↓ | ↑ | 0 | 1 | |
| ↓ | ↑ | 1 | 1 | |
| ↓ | ↑ | 1 | 0 | |
| ↓ Digit Decreasing | | 0 | 0 | HOME |

Figure 7:
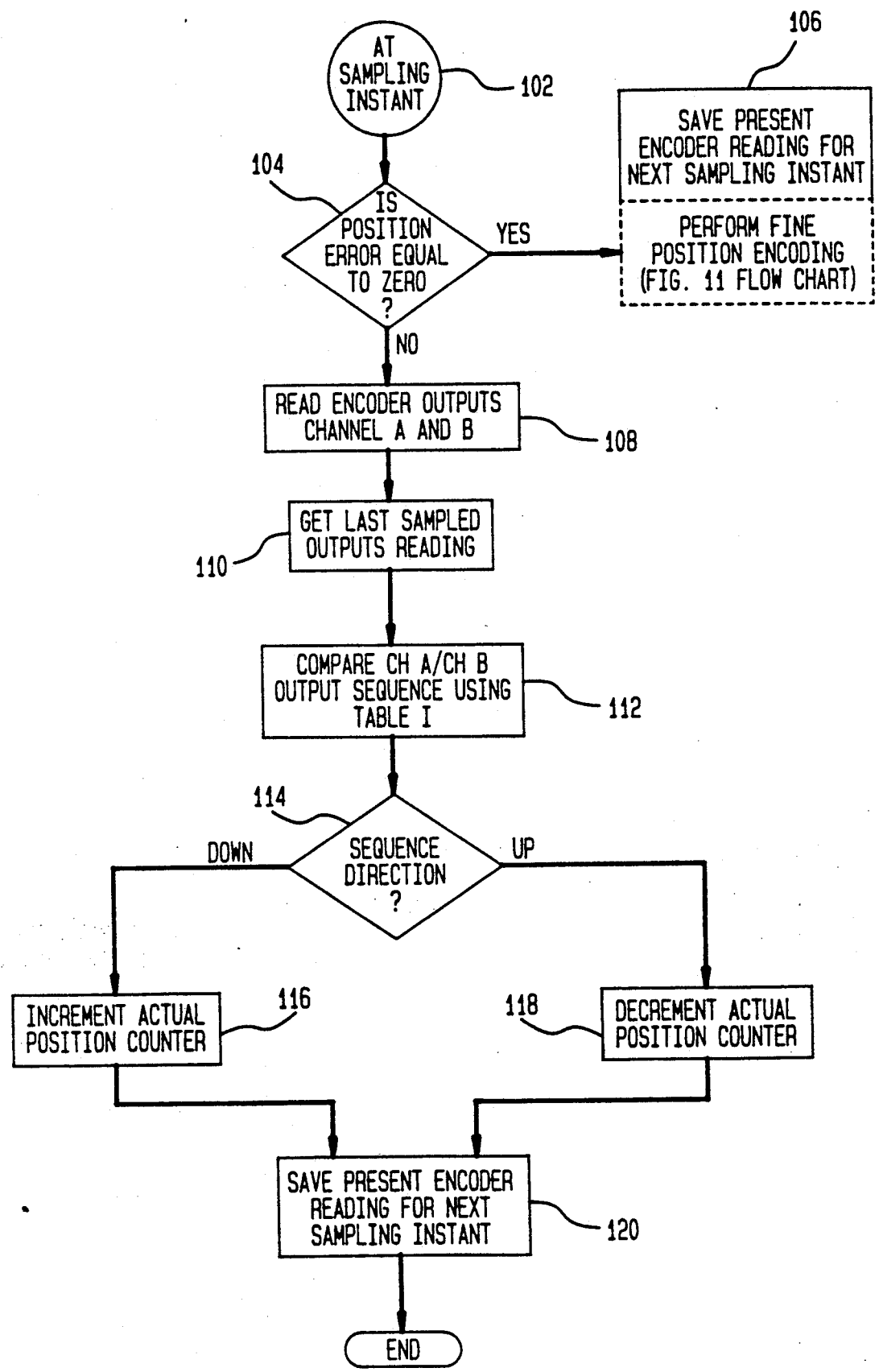
FIG. 7 is a flowchart of a routine for decoding the quadrature outputs of the two channel encoder of FIG. 2.

The quadrature output signals of two channel encoder 24 on the CH A and CH B lines are decoded in accordance with the flow chart of FIG. 7. At each sampling instant 102, the position error is checked in step 104. If it is zero, no error correction is necessary and the present encoder reading is saved in step 106 for the next sampling instant. (For the three channel encoder 60 described below, when the position error is zero, fine position decoding is performed in step 106 in accordance with the flow chart of FIG. 11.) If the position error in step 104 is not zero, the CH A and CH B encoder outputs are read in step 108. In step 110, the encoder reading saved from the last sampling instant is retrieved, and in step 112, the CH A, CH B output sequence is compared (Table I) to obtain the sequence direction. If down (determined in step 114), the actual position counter is incremented in step 116. If up, as determined in step 114, the actual position counter is decremented in step 118. The encoder reading (i.e., the counter reading) is then saved in step 120 for the next sampling instant. The counter readings are processed by microcomputer 34 to determine the actual positions of the print wheels, as described, for example, in the patents referred to above.

The digital compensation control 18 is a control routine derived from a lead/lag compensation filter design for the closed-loop system 10 shown in FIG. 1. Its output, g(T), at every sampling instant T, is a discretized filter output to correct the loop error and provides the desired damping characteristics. The control routine is basically a PID controller (proportional-integral-derivative), but differing in implementation of the derivative control because of the coarse encoder resolution of the system.

A microcomputer implemented control loop for controlling a d.c. motor is described in the patents and patent applications referenced above. Those patents and applications further disclose routines by which the digital compensation control 18 (or a lead/lag filter) is implemented, and routines by means of which the d.c. motor 12 is controlled. As stated above, the disclosures of each of the patents cited above is incorporated herein by reference. Thus, those with skill in the art by means of the disclosure herein and in those patents and patent applications may construct programs implementing the digital compensation control or lead-lag filter 18, the pulse width modulator 20 and the encoder quadrature decoder and counter 26.

The accuracy of encoder 24 for a given sampling time period T is equal to the circumferential width of slotted openings 44. As mentioned above, two channel encoder 24 is a low cost, low resolution quadrature encoder suitable for use in a low bandwidth system, e.g., having a 2.5 ms sampling period (400 Hz bandwidth). Encoder 24 produces only four encoder states per motor shaft revolution, which allows at maximum shaft speed (during slew) at a 2.5 ms sampling time only 300 quadrature transition states per second, and results in a resolution of only ¼ shaft revolution per quadrature state transition. This may be unacceptable in some applications. One way of increasing the resolution of encoder 24 is to narrow the width of the encoder home state, i.e., narrow the width of slotted openings 44 in one or both of the series 46,47 thereof. However, narrower slotted opening widths have the drawback that a slotted opening will be missed at a low sampling rate of only 2.5 ms, and making the slotted openings of only one series narrower, has the drawback that the quadrature states are asymmetrical, which complicates analysis and design of the close loop system. On the other hand, the alternative of a high resolution encoder requires that the not only due to the more expensive higher resolution encoder, but also due to the need to go to a higher bandwidth processor.

Figure 8:
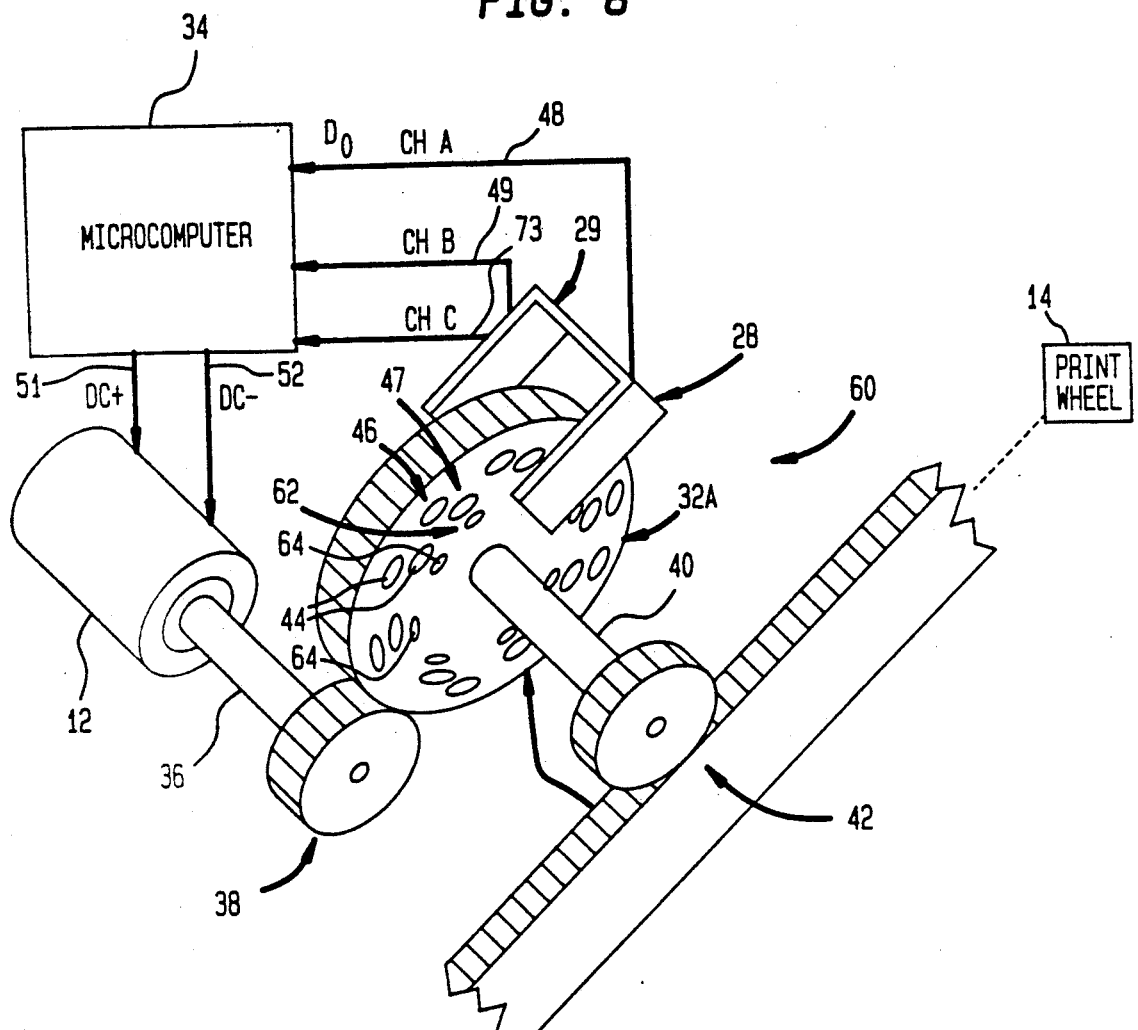
FIG. 8 is a diagram of the drive mechanism for setting the position of the print wheel in the system of FIG. 1 including a two stage, three channel incremental quadrature encoder according to the invention.

Referring to FIG. 8, encoder 60 according to the invention is a two stage or dual mode, three channel, quadrature incremental encoder which has an increased encoder home state accuracy. Encoder 60 includes three channels; channels A and B being the same as CH A and CH B, respectively, of encoder 24 and channel C (CH C) being added. Encoder wheel 32A of encoder 60 includes first series 46 and second series 47 of slotted openings 44 for channels A and B, as described above for encoder 24, and a third series 62 of narrower circumferential width, slotted openings 64 arranged along the circumference of a third, innermost circle, concentric with the circles for series 46 and 47, for channel C. Slotted openings 64 have equal circumferential widths and are equidistantly, angularly spaced along the circumference of the innermost circle. The width of slotted openings 64 is exactly ½ the width of slotted openings 44, and slotted openings 64 are positioned to lie exactly in the center of the circumferential width of slotted openings 44 of the CH B series 47. The slotted openings 44 of the CH A and CH B series 46, 47 of three channel encoder 64 are radially spaced from each other and offset by 90°, as described for two channel encoder 24. The slotted openings 64 of the CH C series 64 are radially spaced inwardly from the slotted openings 44 of the CH B series 47 and are offset from the CH A series 46 openings by 180° and from the CH B series 47 openings by 90°.

Figure 9:
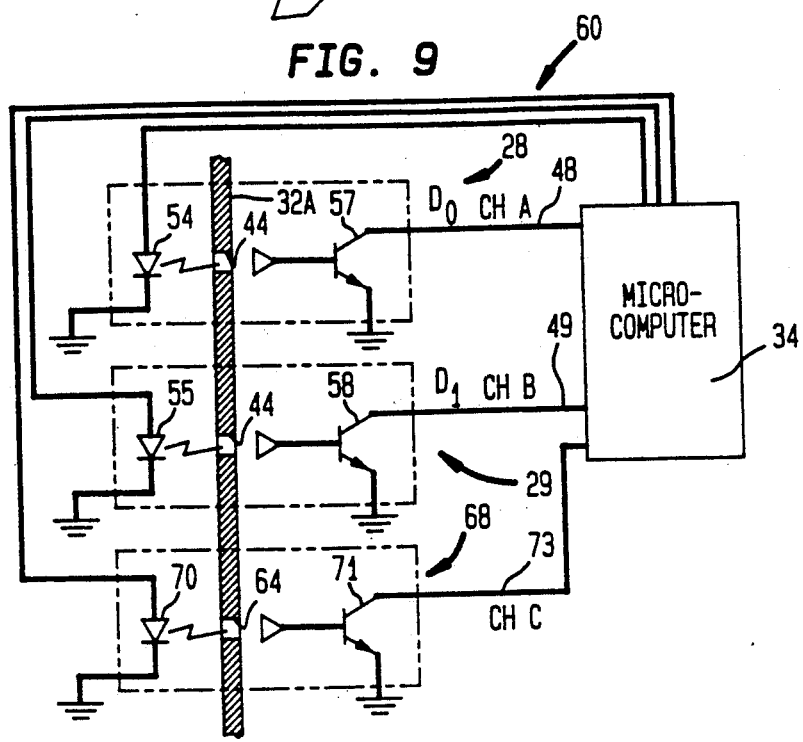
FIG. 9 is a schematic diagram of the sensor for the three channel encoder of FIG. 8.

Encoder 60 (FIG. 9) includes CH A and CH B output sensors 28 and 29, as described for encoder 24, and a CH C output sensor 68. Sensor 68, like each sensors 28 and 29, comprises an LED 70 and a photo transistor 71. LED 70 is selectively connected in series with the source of power by microcomputer 34 and is positioned project light through slotted openings 64. Transistor 71 is positioned on the other side of wheel 32A to receive light projected through slotted openings 64. Transistor 71 is connected as a switch with its emitter connected to ground and its collector coupled to microcomputer 34 as the CH C output line 73. Output lines 48, 49 and 73 are sensed by microcomputer 34 to determine when slotted openings 44 and 64 pass the reference points of LEDs 54, 55 and 70, i.e., when transistors are switched on by light from LEDs 54, 55 and 71. (Transistor on=logic state "0" on the respective output line 48,49 and 73.)

Figure 10:
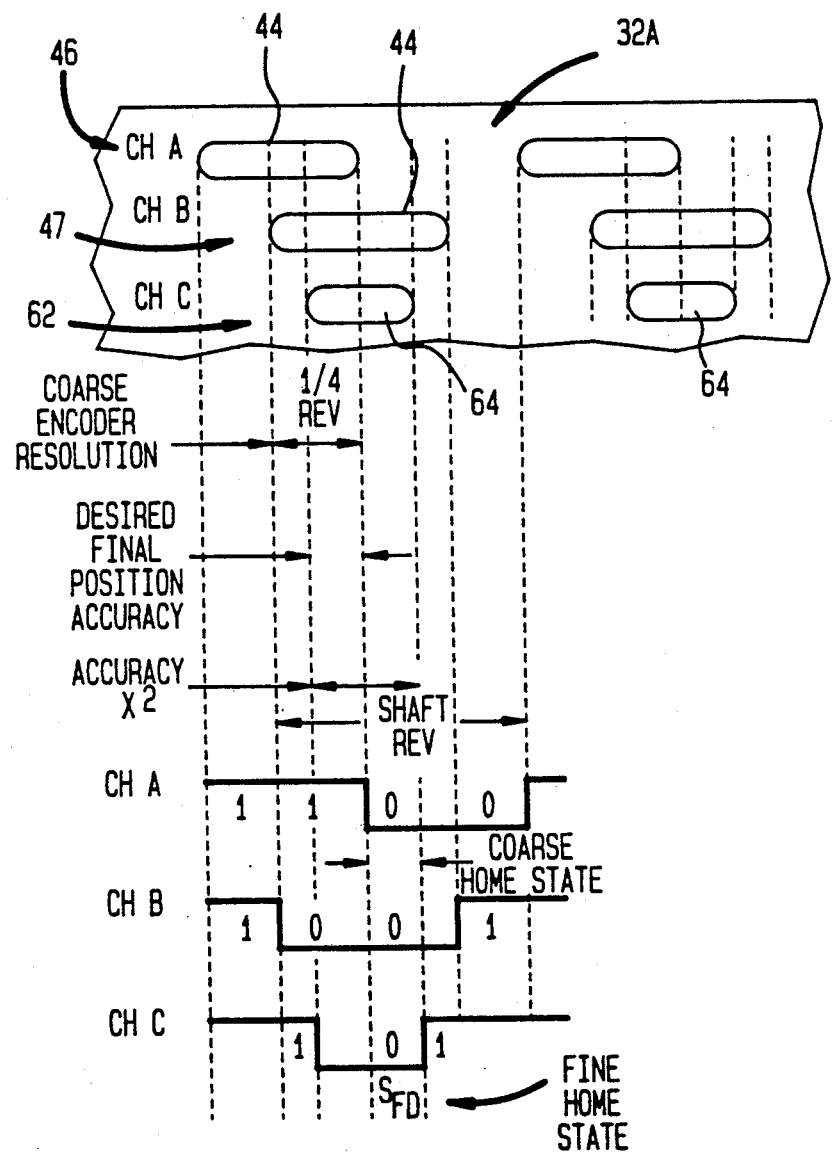
FIG. 10 is a diagram illustrating the relationship of the encoder wheel and the three channel signals generated by the encoder depicted in FIG. 8.

The signals obtained from sensors 28, 29 on the CH A and CH B lines 48 and 49, respectively, and the signal obtained form sensor 68 on the CH C line are shown in FIG. 10. CH A and CH B sensor signals are quadrature decoded as described above and are used for coarse position determination, as described below. The CH C sensor signals are used during a settling time for fine position determination, as described below.

As shown in FIG. 10, the center of each CH C slotted opening 64 is positioned aligned with a final position encoder state (home state) boundary transition for the corresponding CH A and CH B slotted openings 44 in circular series 46,47. The home state for CH's A and B is 00, and the home state transitions are 01 and 10. For CH's A, B and C, the home state is 000 and the home state transitions are 001 and 100. As demonstrated by a comparison of FIGS. 4 and 10, home state 000 for CH's A, B, and C (FIG. 10) is only one half the width of home state 00 for channels A and B (FIG. 4), which corresponds to the relationship that the width of CH C slotted openings 64 is ½ the width of CH A and CH B slotted openings 44. Thus, the final position accuracy attained by three channel encoder 60 of FIG. 7 is twice that of two channel encoder 24 of FIG. 2.

Figure 11:
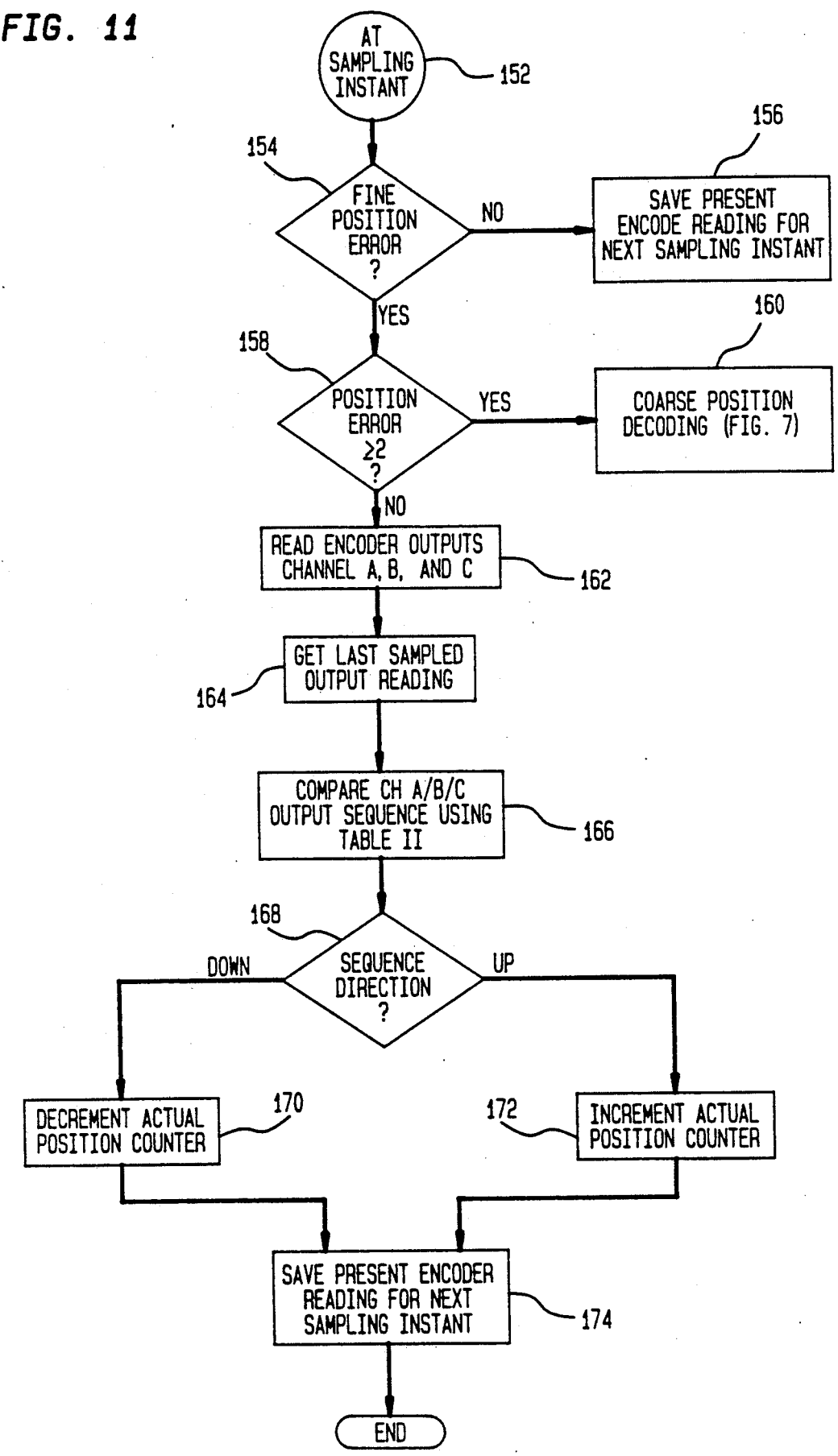
FIG. 11 is a flowchart of a routine for decoding the quadrature outputs of the three channel encoder of FIG. 7.

The routine for coarse position location is the same as for two channel encoder 24 as described above in connection with FIG. 7 during the acceleration, slew, and deceleration stages of the motion of encoder wheel 32, except that in step 106, the two channel encoding routine becomes the course location routine for the three channel encoder 60, and the routine proceeds to fine position decode in accordance with the flow chart of FIG. 11.

TABLE II

| | NORMAL QUADRATURE DECODING/ COUNTING | | SETTLING PERIOD QUADRATURE DECODING/COUNTING | | |
|---|---|---|---|---|---|
| | CH A | CH B | CH A | CH B | CH C |
| MOTION | 0 | 1 | 1 | 1 | 1 |
| DECCELER- | 1 | 1 | 0 | 1 | 1 |
| ATING | 1 | 0 | →0 | 0 | 1 ← POS. ERROR |
| HOME-STATE → | 0 | 0 — SWITCH → | 0 | 0 | 0 ← HOME-STATE |
| (DESIRED | | STATE | 1 | 0 | 0 (DESIRED |
| FINAL | | TABLE | 1 | 0 | 1 FINAL |
| COARSE | | | 1 | 1 | 1 FINE |
| POSITION) | | | | | POSITION) |

Figure 12:
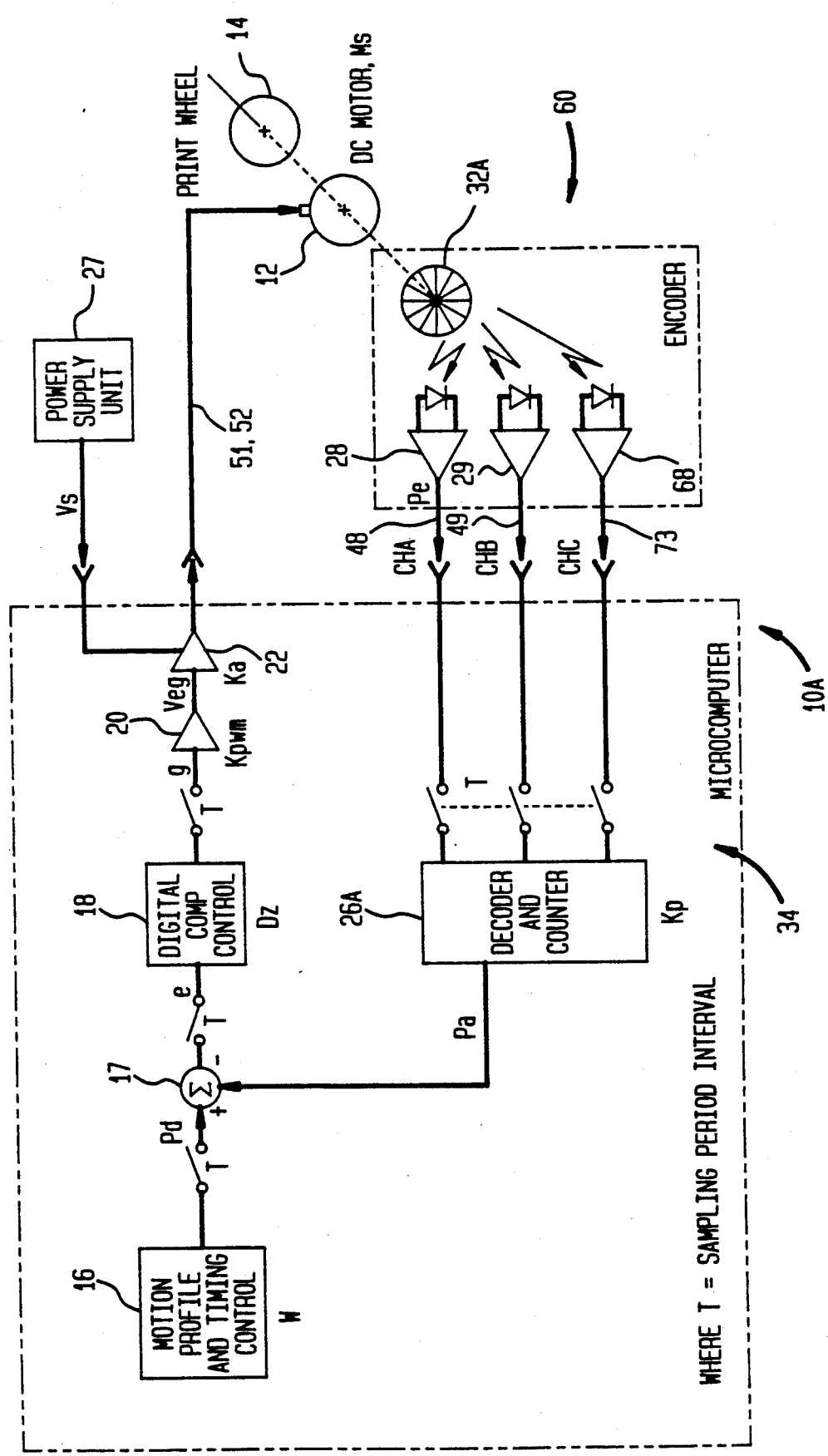
FIG. 12 is a diagram of a model of a servo loop implemented of a print wheel utilizing the three channel encoder of FIG. 8.

Referring to FIGS. 11 and 12 and Table II above, after the motion has decelerated to a coarse home quadrature state according to the FIG. 7 flow chart for CH's A and B, a settling time period takes place during which any motion ceases before it is concluded that setting of print wheel 14 has been completed, i.e., the position error is equal to zero using CH A and CH B decoding.

At this time the control loop 10A (FIG. 12) switches decoder and counter 26A to three channel encoder state decoding and counting according to the flow chart of FIG. 11, where the fine home position state is 000 as illustrated in Table II and FIG. 10.

Referring to FIG. 11, at each sampling instant 152, the fine position routine (loop 10A) in step 154 determines whether there is a position error, i.e., whether the home 000 state is detected. If there is no fine position error, then the routine in step 156 saves the present reading for the next sampling instant and loop 10A does not perform an error-correcting motion. If there is a position error, then the routine proceeds to step 158, where the routine determines whether the coarse position error is equal to or greater than 2. If the position error is equal to or greater than $+/-2$, i.e., the fine position state is 011 or 101, then loop 10A switches decoder and counter 26A back to two channel coarse position determination in accordance with the flow chart of FIG. 7 until CH's A and B outputs again reach a 00 home state. If the error is not equal to or greater than $+/-2$, i.e., the position error is $+/-1$ represented by the 001 or 100 fine position states (desired home position state is 000), then the CH A, CH B and CH C encoder outputs are read in step 162, the last Ch A, CH B and CH C reading retrieved in step 164, and the two sets of readings are compared in step 166 using Table III above to determine sequence direction. If the sequence direction is down as determined in step 168, then in step 170 the actual position count is decremented. If the sequence direction is up, then the actual position counter is incremented in step 172. After the actual position counter is either decremented in step 170 or incremented in step 172, the present encoder reading is saved in step 174 for the next sampling instant.

Thus, a 001 state or a 100 state decoded by decoder and counter 26A (step 158) indicates a position error from the desired home position of 000 even if the home position indication for CH's A and B is 00In that way decoding in loop 10A of the be detected by decoding the signals from two channel encoder 24. Consequently, a 000 state decoded by decoder and counter 26A (step 154) indicates a zero position error in the loop 10A and hence the control output from digital compensation control 18 is zero. On the other hand, a001 or a 100 state decoded by decoder and counter 26A (step 158) indicates a position loop error of $+/-1$ (desired home position is 000) and consequently digital compensation control 18 develops an output in the direction to correct the position error. If the position error is equal to or greater than $+/-2$ (step 158), i.e., 011 or 101, then loop 10A switches decoder and counter 26A back to two channel coarse position determination until CH's A and B outputs again reach a 00 home state. In order not to miss the narrow width CH C slotted openings 66 and the narrower three channel home state 000, decoding using the third channel (CH C) is only performed when the motion of wheel 32A is in the settling phase (motion has stopped of is of low velocity), i.e., wheel 32A has already decelerated to its final two channel home position of 00. Any motion in response to the correction from three channel decoding will have low velocity because the decoding with CH C starts only after the transition to the two channel 00 home state is detected (which occurs during deceleration) and because of the short distance involved to position correct within the two channel home state.

A minimum limit on the final position accuracy that can be encoded is determined by motor drive resolution of loop 10A, i.e., the average voltage output for a position error count of 1 in one control period. Driven by this average voltage, motor 12 must not have a response where the distance it travels is greater than the desired final position accuracy. Typically, this is not a problem because the mechanical time constant is usually greater than the voltage drive resolution. The constraint placed on motor 12 by such a time constant prevents it from having a step response wherein it travels farther than the desired encoder home position accuracy.

Certain changes and modifications of the embodiment of the invention herein disclosed will be readily apparent to those of skill in the art. Moreover, uses of the invention other than in postage meters or to control d.c. motors other than to set print wheels will also be readily apparent to those of skill in the art. It is the applicants, intention to cover by the claims all such uses and all those changes and modifications which could be made to the embodiment to the invention herein chosen for the purposes of disclosure which do not depart from the spirit and scope of the invention.

What is claimed:

1. An incremental position encoder comprising:
    a movable element whose movement is to be encoded;
    first pulse generating means for providing first and second pulse signals having a number of pulses related to an incremental movement of said movable element, the numbers of pulses in said first and second signals being equal for a given incremental movement of said movable element, the widths of the pulses of said first signal being equal to the widths of corresponding pulses of said signals being substantially out of phase, but not less than by 180°; and
    second pulse generating means for providing third signal having number of pulses related to incremental movement of said element, the number of pulses in said third signal being equal to the number of pulses in said first and in said second signals for the same given incremental movement of said element, the widths of the pulses of said third signal being less than the widths of the pulses of said first and second signals, and the pulses of said third signal starting before the start of corresponding pulses of one of said first and said second signals and ending before the end of the pulses of said one signal.

2. The incremental encoder of claim 1 wherein said encoder includes first, second and third outputs for said first, second and third signals, respectively.

3. The incremental encoder of claim 1 wherein said first pulse generating means provides first and second square wave pulse signals.

4. The incremental encoder of claim 3 wherein said second pulse generating means provides rectangular pulses starting after and ending before corresponding cycles of the square wave of said one signal.

5. The incremental encoder of claim 1 wherein said movable element is a wheel, said first pulse generating means comprises first and second series of radially-extending variations in said wheel and said second means comprises a third series of radially-extending variations in said wheel, said first, second and third series of variations being radially spaced and the variations of respective series extending about respective first, second and third radii, the radial widths of said first and second variations being equal and radially offset by half the radial width of a variation, and the radial widths of said variations of said third series being substantially less than the radial widths of the variations of said first and second series and being centered with respect to corresponding variations of one of said first and second series of variations of said first pulse generating means including means for detecting said variations of said first and second series and said second pulse generating means including means for detecting variations of said third means.

6. The incremental encoder of claim 5 wherein said variations of said first, second and third series are optically detectable, said first pulse generating means including means for projecting light at variations in said first and second series of variations and for detecting light emanating from said variations of said first and second series of variations, and said second pulse generating means including means for projecting light at variations of said third series of variations and for detecting light emanating from variations of said third series of variations.

7. The incremental encoder of claim 1 wherein said movable element is a wheel and said first and second pulse generating means include means in said wheel, which optically varies with rotation, said first and second pulse generating means providing said first, second and third signals in response to said means optically varying with rotation of said wheel.

8. The incremental encoder of claim 1 wherein said movable element is a wheel, said first pulse generating means comprises first and second series of radially-extending openings in said wheel and said second means comprises a third series of radially-extending openings in said wheel, said first, second and third series of openings being radially spaced and the openings of respective series extending about first, second and third radii, the radial widths of said first and second openings being equal and radial offset by half the radial width of an opening, and the radial widths of said openings of said third series being substantially less than the radial widths of the openings of said first and second series and being centered with respect to corresponding openings of one of said first and second series of openings, said first pulse generating means including means for projecting light through openings in said first and second series of openings and for detecting light projected through openings of said first and second series of openings, and said second pulse generating means including means for projecting light through openings of said third series of openings and for detecting light projected through openings of said third series of openings.

9. A method of generating signals related to incremental movement of a movable element comprising:
generating first and second pulse signals having a number of pulses related to a incremental movement of said movable element, the numbers of pulses in said first and second signals being equal for a given incremental movement of said movable element, the widths of the pulses of said first signal being equal to the widths of corresponding pulses of said second signal and corresponding pulses of said first and second signals being substantially out of phase, but not less than by 180°;
generating a third signal having a number of pulses related to incremental movement of said element, the number of pulses in said third signal being equal to the number of pulses in said first and in said second signals for the same given incremental movement of said element, the widths of the pulses of said third signal being less than the widths of the pulses of said first and second signals, and the pulses of said third signal starting before the start of corresponding pulses of one of said first and said second signals and ending before the end of the pulses of said one signal.

10. The method of claim 9 including providing said first, second and third signals on first, second and third outputs, respectively.

11. The method of claim 9 wherein said first and second signals are square wave pulse signals.

12. The method of claim 11 wherein said second signal comprises rectangular pulses starting after and ending before corresponding cycles of the square wave of one of said first and second signals.

13. Apparatus for determining a given incremental movement of a movable element from a first fine home position to a second fine home position, comprising:
first pulse generating means for generating first and second pulse signals having a number of pulses related to the incremental movement of said movable element between said first fine home position and a second coarse home position, the numbers of pulses in said first and second signals being equal for said incremental movement of said movable element, the widths of the pulses of said first signal being equal to the widths of corresponding pulses of said second signal and corresponding pulses of said first and second signals being substantially out of phase, but not less than by 180°;
second pulse generating means for generating a third signal having a number of pulses related to said incremental movement of said element, the number of pulses in said third signal being equal to the number of pulses in said first and in said second signals for said incremental movement of said element, the widths of the pulses of said first and second signals, and the pulses of said third signal starting before the start of corresponding pulses of one of said first and said second signals and ending before the end of the pulses of said one signal;
means for counting the transitions of the pulses of said first and second signals starting with movement of said movable element from said first fine home position, the number of said transitions being related to said incremental movement of said movable member; and
means for detecting:
when the number of transitions corresponds to the distance between said first fine home position and second coarse home position;
the simultaneous presence of pulses in said first and second signals corresponding to said second coarse home position of said movable element; and
the simultaneous presence of pulses in said one of said first and second signals and said third signal corresponding to said second fine home position of said movable element.

14. The apparatus of claim 13 wherein said apparatus includes first, second and third outputs for said first, second and third signals, respectively.

15. The apparatus of claim 13 wherein said first pulse generating means provides first and second square wave pulse signals.

16. The apparatus of claim 15 wherein said second pulse generating means provides rectangular pulses starting after and ending before corresponding cycles of the square wave of said one signal.

17. The apparatus of claim 13 wherein said movable element is a wheel, said first pulse generating means comprises first and second series of radially-extending variations in said wheel and said second pulse generating means comprises a third series of radially-extending variations in said wheel, said first, second and third series of variations being radially spaced and the variations of respective series extending first, second and third radii, the radial widths of said first and second variations being equal and radially offset by half the radial width of a variation, and the radial widths of said variations of said third series being substantially less than the radial widths of the variations of said first and second series and being centered with respect to corresponding variations of one of said first and second series of variations, said first pulse generating means including means for detecting said variations of said first and second series and said second pulse generating means including means for detecting variations of said third series.

18. The apparatus of claim 17 wherein said variations of said first, second and third series are optically detectable, said first pulse generating means including means for projecting light at variations in said first and second series of variations and for detecting light emanating from said variations of said first and second series of variations, and said second pulse generating means including means for projecting light at variations of said third series of variations and for detecting light emanating from variations of said third series of variations.

19. The apparatus of claim 13 wherein said movable element is a wheel and said first and second pulse generating means include means in said wheel which optically varies with rotation, said first and second pulse generating means providing said first, second and third signals in response to said means optically varying with rotation of said wheel.

20. The apparatus of claim 13 wherein said movable element is a wheel, said first pulse generating means comprises first and second series of radially-extending openings in said wheel and said second means comprises a third series of radially-extending openings in said wheel, said first, second and third series of openings being radially spaced and the openings of respective series extending about first, second and third radii, the radial widths of said first and second openings being equal and radially offset by half the radial width of an opening, and the radial widths of said openings of said third series being substantially less than the radial widths of the openings of said first and second series and being centered with respect to corresponding openings of one of said first and second series of openings, said first pulse generating means including means for projecting light through openings in said first and second series of openings and for detecting light projected through openings of said first and second series of openings, and said second pulse generating means including means for projecting light through openings of said third series of openings and for detecting light projected through openings of said third series of openings.

21. A method of determining a given incremental movement of a movable element from a first fine home position to a second fine home position, comprising:
generating first and second pulse signals having a number of pulses related to the incremental movement of said movable element between said first fine home position and a second coarse home position, the numbers of pulses in said first and second signals being equal for said incremental movement of said movable element, the widths of the pulses of said first signal being equal to the widths of corresponding pulses of said second signal and corresponding pulses of said first and second signals being substantially out of phase, but not less than by 180°;
generating a third signal having a number of pulses related to said incremental movement of said element, the number of pulses in said third signal being equal to the number of pulses in said first and in said second signals for said incremental movement of said element, the widths of the pulses of said third signal being less than the widths of the pulses of said first an second signals, and the pulses of said third signal starting before the start of corresponding pulses of one of said first and said second signals and ending before the end of the pulses of said one signal;
counting the transitions of the pulses of said at least one signal starting with movement of said movable element from said first fine home position, the number of said transitions being related to said incremental movement of said movable member;
detecting when the number of transitions corresponds to the distance between said first fine position and second coarse home position;
detecting the simultaneous presence of pulses in said first and second signals corresponding to said second coarse home position of said movable element; and
detecting the simultaneous presence of pulses in said one of said first and second signals and said third signal corresponding to said second fine home position of said movable element.

22. The method of claim 21 including providing said first, second and third signals on first, second and third outputs, respectively.

23. The method of claim 21 wherein said first and second signals are square wave pulse signals.

24. The method of claim 23 wherein said second signal comprises rectangular pulses starting after and ending before corresponding cycles of the square wave of one of said first and second signals.

* * * * *